June 2, 1964

S. M. WAAS 3,135,587

AUTOMATIC CONTROLS FOR A NUT ROASTER

Filed July 27, 1960

INVENTOR.
Samuel M. Waas
BY
Hovey, Schmidt, Johnson & Hovey
ATTORNEYS.

INVENTOR.
Samuel M. Waas
BY
Hovey, Schmidt, Johnson & Hovey
ATTORNEYS.

United States Patent Office 3,135,587
Patented June 2, 1964

3,135,587
AUTOMATIC CONTROLS FOR A NUT ROASTER
Samuel M. Waas, Kansas City, Mo., assignor to Manley, Inc., Kansas City, Mo., a corporation of Missouri
Filed July 27, 1960, Ser. No. 45,708
3 Claims. (Cl. 34—45)

This invention relates to an improved nut roasting machine and more particularly to a nut roasting machine provided with an automatic operating assembly capable of effecting successive cycles of operation without operator attention except for maintaining a supply of nuts to be roasted and emptying a collection pan as the same fills with roasted nuts.

It is the most important object of the present invention to provide a nut roasting machine having all of its components under the control of an adjustable thermostatic switch and a timer mechanism actuated thereby, to the end that the receiving of nuts into the receptacle of the machine, the roasting of the latter and the subsequent discharge of the roasted nuts from the machine is governed by the thermostatic switch and timer mechanism, as well as the continual reoccurrence of the cycle.

It is another object of the present invention to provide in structure of the type described above a hopper for nuts to be roasted and a measuring container interconnecting the hopper and the roasting machine, the measuring area being separated by gate valves from both the hopper and the machine, and the gates being concurrently operated by the automatic operating assembly such that a measured quantity of nuts to be roasted may be deposited in the machine.

It is still another object of the instant invention to provide in a machine as above described automatic operating mechanism including means connected with the gates to operate the same concurrently but in opposition so that there is never presented a straight through connection from the hopper to the machine, one of the gates being always closed to prevent such communication.

It is a still further object of the present invention to provide in structure of the type above described an automatic operating assembly including necessary electrical circuitry for completing the sequence of operations referred to above but eliminating extensive use of solenoids and time delay relays such as are present in prior art devices.

Further objects and advantages of the instant invention will become readily apparent as this specification proceeds, and various modifications and changes may be made to the structure about to be described without departing from the spirit of the present invention; therefore, it is intended that such further objects and modifications and changes are intended to be covered by the scope of the appended claims.

The present application is a continuation-in-part of my co-pending United States patent application Serial No. 749,805, filed July 21, 1958, now Patent No. 3,075,295.

Figure 2:
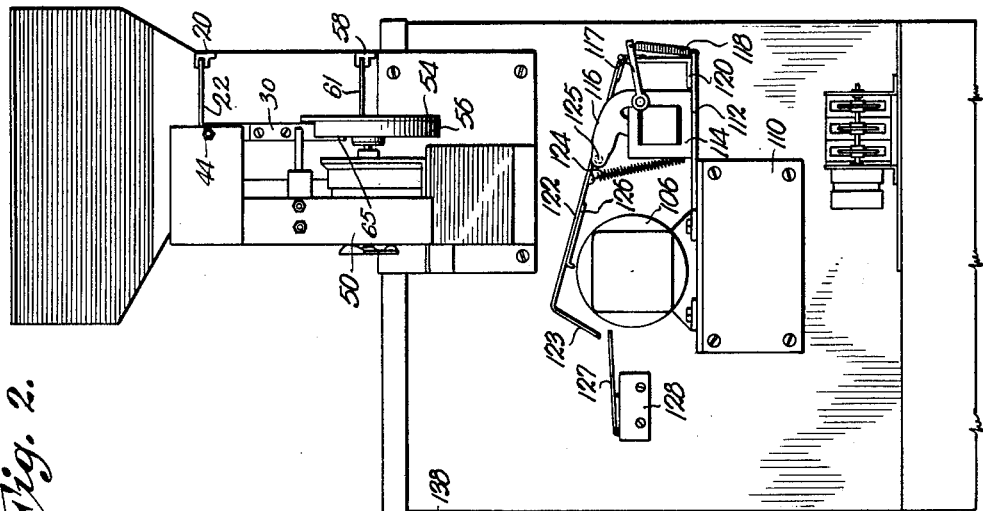
FIG. 2 is a view partly in rear elevation and partly in section to show details of construction of the structure shown in FIG. 1.

An insulated cabinet broadly designated by the numeral 10 houses or supports all of the components of the nut roasting machine illustrated in the drawings. A measuring compartment 12 open at the uppermost and lowermost ends thereof extends through top wall 14 of housing 10 and communicates with a hopper 16 provided with a hingedly mounted lid 18.

Figure 3:
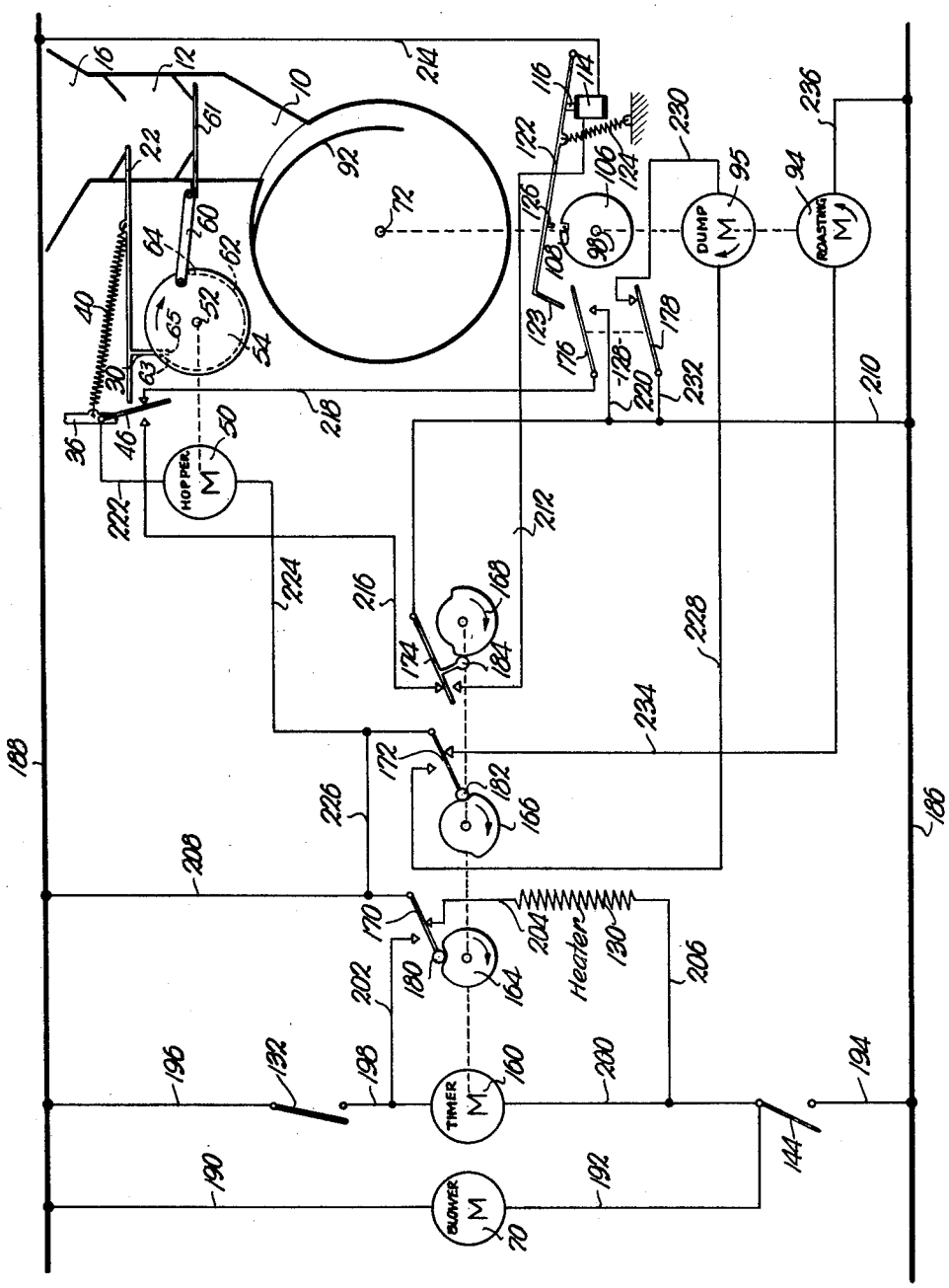
FIG. 3 is a schematic illustration of the automatic operating assembly and electrical circuitry for operating the structure of FIGS. 1 and 2.

A gate valve is provided for opening and closing the area of communication between measuring compartment 12 and hopper 16 including guides 20 and a slide 22, the latter being shiftable within a slot provided therefor in measuring compartment 12 adjacent to hopper 16. Fixed to the bottom of slide 22 is a generally triangular connecting member 24 having a first side 26 connected with slide 22 and a second side 28 extending perpendicularly downwardly from slide 22 and terminating in a finger 30 attached thereto and extending downwardly therefrom further than second side 28 for a reason which will become apparent as this description proceeds. Coupled with the rear wall 32 of cabinet 10 is a mounting bracket 34 which may be fixed to wall 32 in any acceptable manner such as by fastening means or welding or the like. Bracket 34 extends laterally from rear wall 32 and has fixed thereto at the end of bracket 34 furthest remote from rear wall 32 an upwardly extending element 36 which may be fixed to the bracket 34 by any acceptable means such as fasteners 38. A helical spring 40 is connected between slide 22 and the uppermost portion of element 36, the spring 40 continuously biasing the slide 22 toward element 36 and therefore to a position permitting communication between hopper 16 and compartment 12. Below spring 40 a bumper 42 is threaded through element 36 and locked in position by a pair of lock nuts 44. Bumper 42 is positioned to engage second side 28 of connecting member 24 when the same moves towards element 36 under the influence of spring 40. Positioned on element 36 in any suitable manner intermediate the bumper 42 and the connection between element 36 and bracket 34 is a first switch 46. Switch 46 is positioned to engage finger 30 when the same moves towards element 36 under the influence of spring 40, thereby permitting the finger 30 to depress a plunger 48 of switch 46. The reasons for the presence of switch 46 will be more thoroughly set forth as this specification proceeds. Mounted on the bracket 34 is a prime mover 50 which is shown in FIG. 3 as being an electric motor and more particularly is referred to as a hopper motor. Hopper motor 50 has an output shaft 52 to which is coupled a disk 54 having an arcuate cam flange 56. A second gate or gate valve is provided in the zone of communication between measuring compartment 12 and cabinet 10 for blocking and permitting communication between the compartment 12 and the cabinet 10 including guide 58 and a slide 61, the latter being shiftable laterally in a slot provided in the compartment 12 for this purpose. A link 60 is pivotally coupled at one end to slide 61 and at the other end to disk 54 so that rotation of the disk 54 by hopper motor 50 will operate through link 60 to reciprocate slide 61 between its positions, blocking and permitting communication between compartment 12 and cabinet 10. It should be noted that the cam flange 56 of disk 54 is positioned relative to finger 30 such that the finger 30 rides upon the cam flange 56. By referring now to FIG. 3, it can be seen that the cam flange 56 of disk 54 has a pair of spaced ends 63 and 64. The plane of disk 54 is alongside the path of movement of finger 30 so that the latter may move into the space between ends 63 and 64 of the split, band-like flange 56. As disk 54 rotates clockwise, viewing FIG. 3, end 63, engaging finger 30, forces the latter toward compartment 12 and thereby forces slide 22 to its closed position. As slide 22 reaches its closed position, flange 56 moves beneath finger 30. The lower extremity 65 (FIGS. 2 and 3) of finger 30 then slides against the outer surface of flange 56 until end 64 approaches extremity 65. When end 64 passes from beneath extremity 65, the finger 30 returns into the space between ends 63 and 64 and out of engagement with the outer face of flange 56 under influence of spring 40, which draws finger 30 and slide 22 in a direction away from compartment 12 until finger 30 strikes end 63.

A closure 66 for the front of the cabinet 10 is held in place by suitable fasteners (not shown). The closure 66 supports a foraminous housing 68 on its outermost face within which is contained certain of the electrical components of the machine hereinafter described. An electric motor 70 within the housing 68 has its drive shaft 72 extending through the closure 66 and operably coupled with a blower 74 disposed in a foraminous cylinder 76 secured to the inner face of closure 66. The innermost end of the shaft 72 is supported by vertical disk 78 that is in turn supported by rods 80 extending inwardly from closure 66.

A roasting receptacle 82 is rotatably mounted in the cabinet 10 beneath compartment 12 in surrounding relationship to the cylinder 76. Receptacle 82 has a cylindrical wall 84 spanning the distance between a pair of circular end disks 86 and 88. The wall 84 is provided with overlapping ends to present an opening 90 that spans the distance between the disks 86 and 88. To this end, an apron 92, which is coextensive in length with the distance between ends 86 and 88, extends inwardly into the receptacle 82 somewhat spirally toward the horizontal axis of rotation of receptacle 82.

A pair of electric motors 94 and 95, which are drivable in opposite directions, are ganged together on the same shaft 98 and have a coupling 96 secured to drive shaft 98 which in turn is provided with a lateral finger 100. A tubular hub 102 rigid to the outer face of end disk 88 receives the coupling 96 and is provided with a slot 104 which in turn receives the finger 100. Fixed to the drive shaft 98 to rotate therewith intermediate motors 94 and 95 and coupling 96 is a disk 106 which is generally annular and provided as shown in FIG. 3 with a slot 108 extending radially inwardly from the outer periphery of disk 106 toward the drive shaft 98 but terminating in spaced relation thereto. It will be noted that the electric motors 94 and 95 are supported on a generally L-shaped bracket 110 supported from rear wall 32 of cabinet 10 in any suitable manner.

A mounting plate 112 extends from bracket 110 toward one side of cabinet 10 and there is mounted thereon a solenoid 114 provided with a swingable core 116. Core 116 is provided with a finger 117 extending therefrom in bell crank relationship, the finger 117 and swingable core 116 being joined at a bearing area which is pivoted to the solenoid 114. A spring 118 connects the end of finger 117 furthermost extended from the swingable core 116 and the bottom of mounting plate 112 to continuously bias core 116 to its position furthermost raised from solenoid 114. An L-shaped bracket 120 is fixed to mounting plate 112 and extends upwardly therefrom, terminating in a hinged connection with a hinged arm 122 which extends therefrom over the periphery of disk 106 and terminates in a flange 123 extending downwardly toward bracket 110 on the opposite side from mounting plate 112. Intermediate the flange 123 and the hinged connection between arm 122 and bracket 120 an L-shaped detent 126 is secured to the bottom of arm 122 and positioned to be engageable with slot 108 of disk 106. Intermediate the L-shaped detent 126 and the hinged connection between arm 122 and bracket 120 a spring 124 is connected to the bottom side of arm 122, the other end of which is secured to mounting plate 112 and which continuously biases the arm 122 in the counterclockwise direction, as viewed in FIG. 2. Swingable core 116 is pivotally connected to arm 122, as at 125, and it is to be noted that spring 118 is stronger than spring 124 but not as strong as spring 124 in combination with the electromagnetic force of solenoid 114. It can therefore be seen that when the solenoid 114 is not energized the force of spring 118 will prevail, holding the arm 122 in the position shown in FIG. 2, and that when the solenoid 114 is energized the combined force of the solenoid and spring 124 will pull the arm 122 downwardly such that detent 126 may engage the slot 108 in disk 106 when the slot reaches a position adjacent to the detent and also such that flange 123 will engage and depress the bar 127 of ganged switch 128.

A U-shaped electric heater 130 extends inwardly from closure 66 into the cylinder 76 in looped relationship to the blower 74, and a thermostat 132 within the blower 74 has its leads 134 passing through the closure 66 into operative relationship with an adjusting shaft 136 for the thermostat 132. A peripherally indented indicating disk 138 exterior of the housing 68 is normally in seated relationship with a roller 140 carried by a spring element 142 mounted on housing 68. A manual switch 144 on the front face of housing 68 controls the circuitry shown in FIG. 3.

The front of the cabinet 10 beneath closure 66 is open for accessibility to an open top collection pan 146 disposed in cabinet 10 beneath receptacle 82 and provided with handle 148 for ease in removing pan 146.

Handles (not shown) are provided on the closure 66 to facilitate removal of the latter after release of the means which fasten the closure 66 to the cabinet 10.

In addition to the structure already described there is contained in cabinet 10 on suitable mounting means provided therefor a timer motor 160 having an output shaft 162 to which are connected in order cams 164, 166 and 168.

With reference to the motors which have been described, electric motor 50 will be referred to as a hopper motor, electric motor 70 as a blower motor, electric motor 94 as a roasting motor, electric motor 95 as a dump motor and electric motor 160 as a timer motor. The motors are thus referred to for ease in explaining the operation, particularly with reference to the schematic diagram in FIG. 3.

Referring now to FIG. 3, it should be noted at the outset that each of the cams 164, 166, and 168 are provided with single pole double throw switches 170, 172 and 174, respectively. In addition, it should be noted that ganged switch 128 in reality comprises a pair of single pole single throw switches 176 and 178 which are ganged together as indicated. Further, it should be noted that each of the switches 170, 172 and 174 are provided with cam follower rollers 180, 182 and 184, respectively. It should also be noted that each of the cams 164, 166 and 168, as previously described, are provided with dwell portions and raised sections for purposes of operating the single pole double throw switches 170, 172 and 174.

Referring specifically now to the wiring shown in the diagram of FIG. 3, there is provided a pair of main lead wires 186 and 188. A wire 190 connects wire 188 with blower 70 and a wire 192 connects blower 70 to one side of manual switch 144. The contact of switch 144 is connected by wire 194 with wire 186. A wire 196 connects main lead wire 188 with one side of thermostat switch 132, the contact of thermostat switch 132 being connected by wire 198 with timer motor 160. Timer motor 160 is connected by wire 200 with the same side of manual switch 144 that wire 192 is connected with. A wire 202 connects wire 198 with one throw of switch 170, the other throw of switch 170 being connected by wire 204 with one side of heater 130, the other side of heater 130 being connected by wire 206 to wire 200. Wire 208 is provided for connecting main lead wire 188 with the pole of switch 170. A wire 210 is provided for connecting main lead 186 with the pole of switch 174, one throw of switch 174 being connected by wire 212 to solenoid 114, the latter being further provided with a wire 214 coupling solenoid 114 with main lead 188. The other throw of switch 174 is connected by wire 216 to one throw of single pole double throw switch 46, the other throw of switch 46 being connected by wire 218 to the pole of switch 176. The throw of switch 176 is connected by wire 220 to wire 210. The pole of switch 46 is connected by wire 222 to hopper motor 50, the latter being provided with a second wire 224 connecting hopper motor 50 with the pole of switch 172. A jumper wire 226 is provided for connecting wires 208 and 224. One throw of switch 172 is connected by wire 228 with dump motor 95, the latter being provided with a second wire 230 coupling the dump motor 95 with the throw of switch 178. The pole of switch 178 is provided with a wire 232 coupling the pole with wire 210. The other throw of switch 172 is provided with a wire 234 connecting switch 172 with roasting motor 94, the latter being further provided with a wire 236 coupling the motor with main lead 186. It should be understood at this point that all of the circuitry described may be appropriately fused, the same not being shown for purposes of simplifying the schematic diagram.

Figure 1:
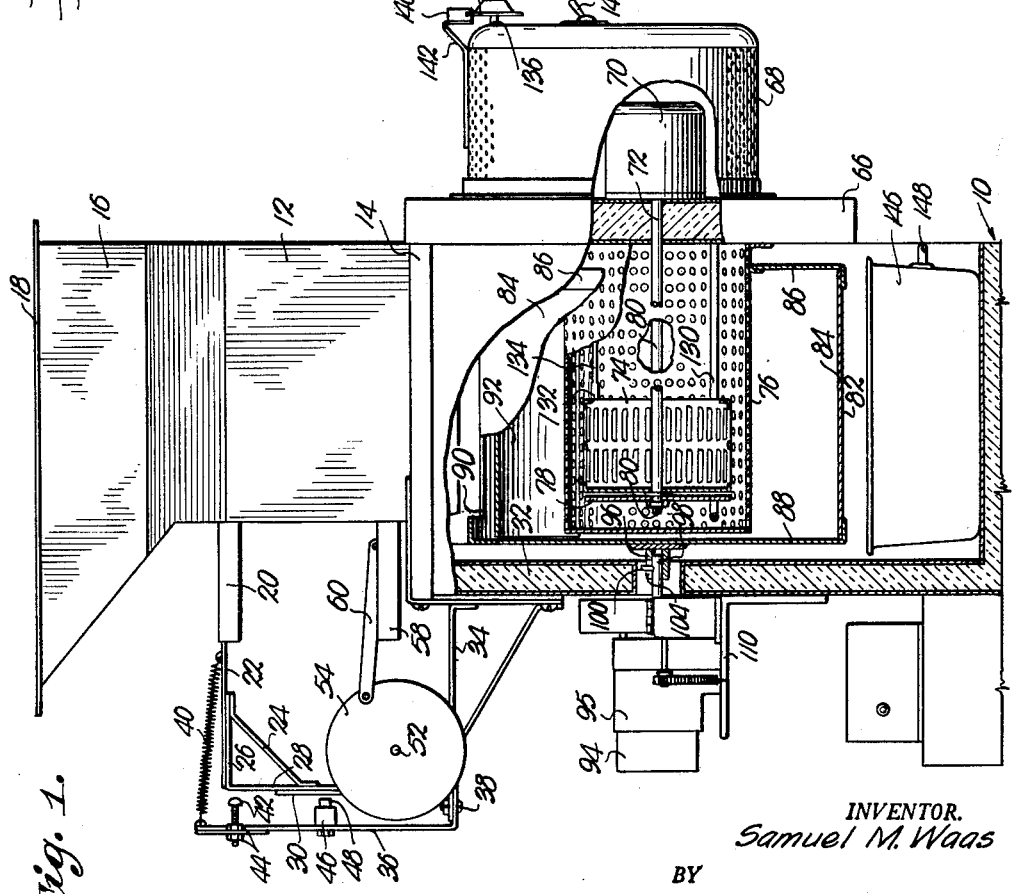
FIGURE 1 is a view partly in side elevation and partly in section of structure embodying the present invention.

Having therefore described all of the structure of the present invention, it remains only to show how the same operates. For purposes of considering the operation of the present machine, let it be assumed that a supply of fresh nuts to be roasted is present in the receptacle 82 and that a cycle of operation is just beginning. Let it further be assumed that leads 186 and 188 are connected to a plug of the common variety, the same being plugged into a common female outlet. When such takes place a circuit is completed, operating the roasting motor by virtue of current flow through wires 186, 236, roasting motor 94, wire 234, the pole of switch 172, wire 224 and wire 226, wire 208 and wire 188. However, nothing further happens at this point except that the receptacle 82 rotates in response to motor 94. When the manual switch 144 is closed the blower motor 70 will be operated by virtue of a circuit completed through wire 186, wire 194, switch 144, wire 192, blower 70, wire 190 and wire 188. A circuit will further be completed to energize the heater 130 through wire 186, wire 194, switch 144, wire 200, wire 206, heater 130, wire 204, the pole of switch 170, wire 208 and wire 188. The air will then be circulating in the receptacle 82 and the heater 130 will be heating the air to roast the nuts contained in the receptacle 82. When a preselected temperature is reached in the receptacle 82 thermostatic switch 132 will close, thereby completing a circuit to operate timer motor 160. The circuit for operating timer motor 160 is as follows: Wire 186, wire 194, switch 144, wire 200, timer motor 160, wire 198, switch 132, wire 196 and wire 188. Energization of the timer motor 160 will cause the cams 164, 166 and 168 which are ganged on the output shaft 162 to rotate in the clockwise direction, as viewed in FIG. 3. Referring specifically to cam 164, the first thing that will happen is that the cam follower roller 180 of switch 170 will roll from the dwell portion to the high surface of cam 164, breaking the circuit previously described for energizing heater 130 and completing a holding circuit comprising wire 186, wire 194, switch 144, wire 200, timer motor 160, wire 198, wire 202, the pole of switch 170, wire 208 and wire 188. This holding circuit will insure that the timer motor remains energized even though the temperature lowers in the receptacle 82 due to the fact that heater 130 has been deenergized. The next thing that will happen is that rotation of cam 166 will cause the cam follower roller 182 of switch 172 to roll up upon the raised portion of cam 166 from the dwell portion, thereby breaking the circuit which energized the roasting motor 94 and completing a circuit to operate the dump motor 95 as follows: wire 186, wire 210, wire 232, switch 178, wire 230, dump motor 95, wire 228, switch 172, wire 224, wire 226, wire 208 and wire 188. The receptacle 82 will now be rotated in the reverse direction from which motor 94 rotated it, and the material contained in the receptacle 82 will be caused to be discharged into the collection pan 146 through the opening 90. The next thing that will happen is that the cam follower roller 184 will be caused to roll off the high portion of cam 168 and onto the dwell portion thereof, thereby completing a circuit comprising wires 186, wire 210, switch 174, wire 212, solenoid 114, wire 214 and wire 188. Solenoid 114 having been energized, the arm 122 will be depressed such that the detent 126 will engage the slot 108 when the same is rotated to the proper position by dump motor 95, and, in addition, flange 123 will depress the ganged switches 176 and 178. The change of position of switches 176 and 178 will accomplish the following. Firstly, the circuit completed to drive the dump motor 95 will be broken by virtue of opening switch 178. Secondly, the closing of switch 176 will complete a circuit including wire 186, wire 210, wire 220, switch 176, wire 218, switch 96, wire 222, hopper motor 50, wire 224, wire 226, wire 208 and wire 188. The last mentioned action will drive the hopper motor to rotate the disk 54 which will withdraw slide 61, permitting the fresh nuts contained in measuring compartment 12 to drop through the opening 90 into the receptacle 82. At the same time the slide 22 will have been moved forwardly blocking communication between the measuring compartment 12 and the hopper 16 so that only a measured quantity of nuts may be dropped into the receptacle 82. This is accomplished by the fact that the finger 30 rides on the cam flange 64 of disk 54 such that the slide 22 is pushed forwardly and remains forwardly until the finger 30 is released from the dwell portion of flange 62. When the disk 54 has almost completely traveled a full revolution such that the slide 61 is again closing communication between the measuring compartment 12 and receptacle 82 the timer motor will have completely rotated the cams 164, 166 and 168 through one revolution. Switch 170 will break the holding circuit previously described and thermostat switch 132 will be open as a result of the cooling which has taken place during the course of the operations described. Furthermore the roasting motor will be reenergized and the cycle will begin repeating. In order to provide for the disk 54 making a complete revolution so that it is ready for its operation in the subsequent cycle, the spring 40 is provided which yanks the slide 22 and connecting member 24 and finger 30 rearwardly, as viewed in FIGS. 1 and 3, depressing the plunger 48 of switch 46 and rebounding off bumper 42 to return to its normal position. During the instant that the plunger 48 of switch 46 is in the depressed position a circuit is completed including wire 186, wire 210, switch 174, wire 216, switch 46, wire 222, hopper motor 50, wire 224, wire 226, wire 208 and wire 188. While this circuit is very short lived due to the construction described, it is sufficient to return the disk 54 to the position where slide 61 is completely closed and compartment 12 is open for communication with hopper 16 such that a new quantity of fresh nuts to be roasted may be measured in the compartment 12 without any communication between the compartment 12 and the receptacle 82. Further, the mechanism for the slides 22 and 61 is in exactly the right position for the next cycle.

Having thus described the invention what is claimed as new and desired to be secured by Letters Patent is:

1. In a material roasting machine, a rotatable receptacle; means for feeding material into the receptacle, including means defining a material passage, a pair of spaced gates shiftable alternately to and from a position closing the passage, means yieldably holding one of said gates biased toward its open position, a finger rigidly coupled with said one gate, a rotatable disc, a link pivotally interconnecting said disc and the other gate for shifting the latter to and from its closed position as the disc rotates, the pivotal connection between the link and the disc being spaced from the axis of rotation of the latter, a laterally-extending, arcuate flange on the disc concentric with said axis of rotation of the later and engageable with said finger for shifting said one gate to its closed position as the disc opens the other gate, an electric device connected with said disc for rotating the latter, and an electric switch operably coupled with said device, said one gate engaging the switch to de-energize the device when the one gate is open; a pair of motors operably connected with said receptacle and adapted to alternately rotate the receptacle in opposite directions; means for automatically de-energizing one of said motors and energizing the other motor after the one motor has rotated the receptacle in one direction for a predetermined period of time; and means for automatically de-energizing the other motor and energizing said device after said other motor has rotated the receptacle in the opposite direction for a predetermined period of time.

2. In a material roasting machine, a rotatable receptacle; means for feeding material into the receptacle, including means defining a material passages, a pair of spaced gates shiftable alternately to and from a position closing the passage, means yieldably holding one of said gates biased toward its open position, a rotatable disc, a link pivotally interconnecting said disc and the other gate for shifting the latter to and from its closed position as the disc rotates, the pivotal connection between the link and the disc being spaced from the axis of rotation of the latter, and a laterally-extending, arcuate flange on the disc concentric with said axis of rotation of the latter and operably coupled with said one gate for shifting the latter to its closed position as the disc opens the other gate; a notched element rotatable with said receptacle; a support; a movable arm pivotally mounted on the support and having means thereon receivable within said notch; means yieldably biasing the arm toward the periphery of said element; releasable structure normally holding the arm spaced from said periphery; a pair of motors operably connected with said receptacle and adapted to alternately rotate the receptacle in opposite directions; means for automatically de-energizing one of said motors and energizing the other motor after the one motor has rotated the receptacle in one direction for a predetermined period of time; means for automatically swinging the arm toward said periphery against the holding action of said structure after said other motor has rotated the receptacle in the opposite direction for a predetermined period of time whereby the means on said arm may be received within said notch; and means engageable by said arm when the means thereon enters the notch for de-energizing the other motor and initiating operation of said feeding means.

3. In a material roasting machine, a rotatable receptacle; means for feeding material into the receptacle, including means defining a material passage, a pair of spaced gates shiftable alternately to and from a position closing the passage, means yieldably holding one of said gates biased toward its open position, a rotatable disc, a link pivotally interconnecting said disc and the other gate for shifting the latter to and from its closed position as the disc rotates, the pivotal connection between the link and the disc being spaced from the axis of rotation of the later, a laterally-extending arcuate flange on the disc concentric with said axis of rotation of the latter and operably coupled with said one gate for shifting the latter to its closed position as the disc opens the other gate, an electric device connected with said disc for rotating the latter, and an electric switch operably coupled with said device, said one gate engaging the switch to de-energize the device when the one gate is open; a notched element rotatable with said receptacle; a support; a movable arm pivotally mounted on the support and having means thereon receivable within said notch; means yieldably biasing the arm toward the periphery of said element; releasable structure normally holding the arm spaced from said periphery; a pair of motors operably connected with said receptacle and adapted to alternately rotate the receptacle in opposite directions; means for automatically de-energizing one of said motors and energizing the other motor after the one motor has rotated the receptacle in one direction for a predetermined period of time; means for automatically swinging the arm toward said periphery against the holding action of said structure after said other motor has rotated the receptacle in the opposite direction for a predetermined period of time whereby the means on said arm may be received within said notch; and means engageable by said arm when the means thereon enters the notch for de-energizing the other motor and energizing said device.

References Cited in the file of this patent
UNITED STATES PATENTS

| | | |
|---|---|---|
| 2,004,500 | Brunelle | June 11, 1935 |
| 2,188,969 | Waldvogel | Feb. 6, 1940 |
| 2,327,282 | McComb | Aug. 17, 1943 |
| 2,510,866 | Currier | June 6, 1950 |
| 2,522,448 | Husk et al. | Sept. 12, 1950 |
| 3,028,680 | Conlee | Apr. 10, 1962 |
| 3,034,221 | Tuck | May 15, 1962 |